United States Patent [19]

Amemori et al.

[11] Patent Number: 5,668,327
[45] Date of Patent: Sep. 16, 1997

[54] FLOWMETER HAVING REVERSIBLE TRANSMITTER AND RECEIVER

[75] Inventors: Masanori Amemori; Toshiyuki Hasegawa; Takeshi Miyamoto; Shinya Nozaki; Takashi Kobayashi, all of Higashi-Matsuyama, Japan

[73] Assignee: Zexel Corporation, Tokyo, Japan

[21] Appl. No.: 592,680

[22] Filed: Jan. 26, 1996

[30] Foreign Application Priority Data

Jan. 26, 1995 [JP] Japan ................. 7-010974

[51] Int. Cl.6 ........................... G01F 1/06
[52] U.S. Cl. ................. 73/861.77; 73/861.79
[58] Field of Search ............... 73/861.75, 861.77, 73/861.79; 359/154, 144

[56] References Cited

U.S. PATENT DOCUMENTS

| | | | |
|---|---|---|---|
| 3,788,285 | 1/1974 | Gelin et al. | 73/861.77 |
| 4,348,906 | 9/1982 | Feller | 73/861.77 |
| 4,428,243 | 1/1984 | Taylor | 73/861.77 |
| 4,885,943 | 12/1989 | Tootell et al. | 73/861.77 |
| 4,936,151 | 6/1990 | Tokoi | 73/861.77 |

*Primary Examiner*—Richard Chilcot
*Assistant Examiner*—Harshad Patel
*Attorney, Agent, or Firm*—Wenderoth, Lind & Ponack

[57] ABSTRACT

A flowmeter which obtains the flow rate of a fluid by detecting the rotational speed of an impeller is provided with a transmitter for transmitting a laser beam or ultrasonic wave to the tip end of the rotating impeller, a receiver for capturing the laser beam or ultrasonic wave reflected by the impeller, and a data processing unit for calculating the difference between the frequency of signals captured by the receiver and the frequency of signals transmitted by the transmitter and for calculating the rotational speed of the impeller based on the calculated values.

6 Claims, 8 Drawing Sheets

FLOWMETER HAVING REVERSIBLE TRANSMITTER AND RECEIVER

BACKGROUND OF THE INVENTION

1. Field of the Invention

The present invention relates to a flowmeter for measuring the flow rate of fluids, and in particular to a flowmeter for obtaining a flow rate by detecting the rotational speed of impellers which are caused to rotate by fluid.

2. Description of the Related Art

There are generally several types of flowmeters for detecting the flow rate of fluids, for example, a type that detects the calorie taken away from by movements of the fluid, and a type that detects mechanical movements activated by a force which the fluid has, etc. However, either type has shortcomings because large errors are produced in the detected flow rate or they may influence the flow of the fluid by the detection operation itself which creates a resistance to the flow of the fluid, etc.

An impeller type flowmeter, shown in FIG. 1, represented by a waterway flowmeter, has such a mechanism that a flow channel 1b of fluid is produced in the direction of the arrow A—A which is the tangential direction of an impeller 1a, wherein the impeller 1a rotates due to the force of the flowing fluid when the flow exceeds a certain flow rate, and rotation of the impeller 1a is detected mainly by a gear unit (not illustrated) in the vicinity of the axis 1c of the impeller 1a which is the center of rotation, and the detected rotation is transmitted to an instrument panel where the flow rate of the fluid is displayed.

Furthermore, although the fuel injection quantity must be accurately controlled in a diesel engine, the injection quantity has conventionally been detected indirectly by calculating the fuel injection quantity from the number of engine rotations at that time through detecting the control rack position of an in-line fuel injection pump or detecting the control sleeve position of a distributor type fuel injection pump.

There are some problems associated with this type of detection such as wear of and backlashes in a gear mechanism. It was difficult to make an impeller type flowmeter very small and to accurately detect the flow rate of high speed fluids due to a complicated construction of a mechanism which consists of mechanical elements.

Furthermore, in a fuel injection pump of a diesel engine, it is difficult to accurately detect the fuel injection quantity because the injection quantity may change due to inconsistencies in the quality of such factors as machining accuracy, assembling accuracy, etc., and chronological changes thereof.

SUMMARY OF THE INVENTION

The present invention is directed making an impeller type flowmeter small enough so as not to receive influences due to wear and backlash of gears.

The invention is directed to the detection of the flow rate of high speed fluids.

The invention is directed to detecting an instantaneous rotational speed of an impeller and to ensure the metering of non-steady flows.

The invention is directed to detecting the rotational speed even though the impeller rotates in either direction depending on the flow direction.

The invention is directed to detecting the rotational speed of an impeller and at the same time detecting the flow direction of fluid.

The invention is directed to accurately detecting the flow rate so as not to influence the injection characteristics of fuel.

The invention is directed to detecting the injection rate which is a non-steady flow during the period of injection by improving the response for the flow rate changes.

The invention is directed to matching high injection pressure by making the pressure receiving surface small.

The invention is directed to making an inertia force small by reducing a turbine mass, whereby the flowmeter is made very durable against external impacts.

The invention is directed to making the interval between light emitting elements and light receiving elements, whereby low output light emitting elements and low sensitivity light receiving elements are able to be used to decrease the production cost.

The invention is directed to causing a flowmeter not to be influenced by electromagnetic noises, etc, when detecting the number of revolutions of a turbine.

It is therefore an object of the invention to provide a flowmeter to grasp a flow rate of a fluid by detecting the rotational speed of an impeller disposed in a flow channel of fluid to be metered. The flowmeter includes a transmitting means for transmitting a laser beam or ultrasonic wave to the tip end of the impeller which is in revolution, a receiving means for receiving the laser beam or ultrasonic wave which is reflected from the impeller and a data processing means for obtaining, through calculations, the difference between the frequency which is captured by the receiving means and the frequency transmitted by the transmitting means and for detecting the rotational speed of the impeller based on the value obtained.

With the present invention, a laser beam or ultrasonic wave is transmitted to the tip end of an impeller which is disposed in a flow channel of the fluid to be metered and is revolving, and the laser or ultrasonic wave reflected by the impeller is captured by the receiving means, whereby the difference between the frequency of the captured signals and the frequency of the transmitted signal is calculated, and the rotational speed of the impeller is able to be detected by the obtained value.

DETAILED DESCRIPTION OF PREFERRED EMBODIMENTS

Description is given of the details of the invention with reference to the drawings attached herewith.

Generally speaking, the Doppler effect is produced in a case where a pulsation source which generates pulsations of sound signals, electric signals and light, etc. and a subject which captures the abovementioned pulsations are moving relative to each other.

When the distance between the abovementioned pulsation source and the subject which captures the pulsations is decreased, surplus signals are observed in a fixed duration of time to cause the frequency of the captured pulsations to be increased more than the inherent frequency of the pulsations. To the contrary, when the distance between the pulsation source and the subject which captures the pulsations is increased, the frequency of the captured pulsations is decreased less than the inherent frequency thereof.

In the preferred embodiment, the rotational speed of an impeller disposed in a flow channel of a fluid to be metered is detected by utilizing the above Doppler effect.

Figure 1:
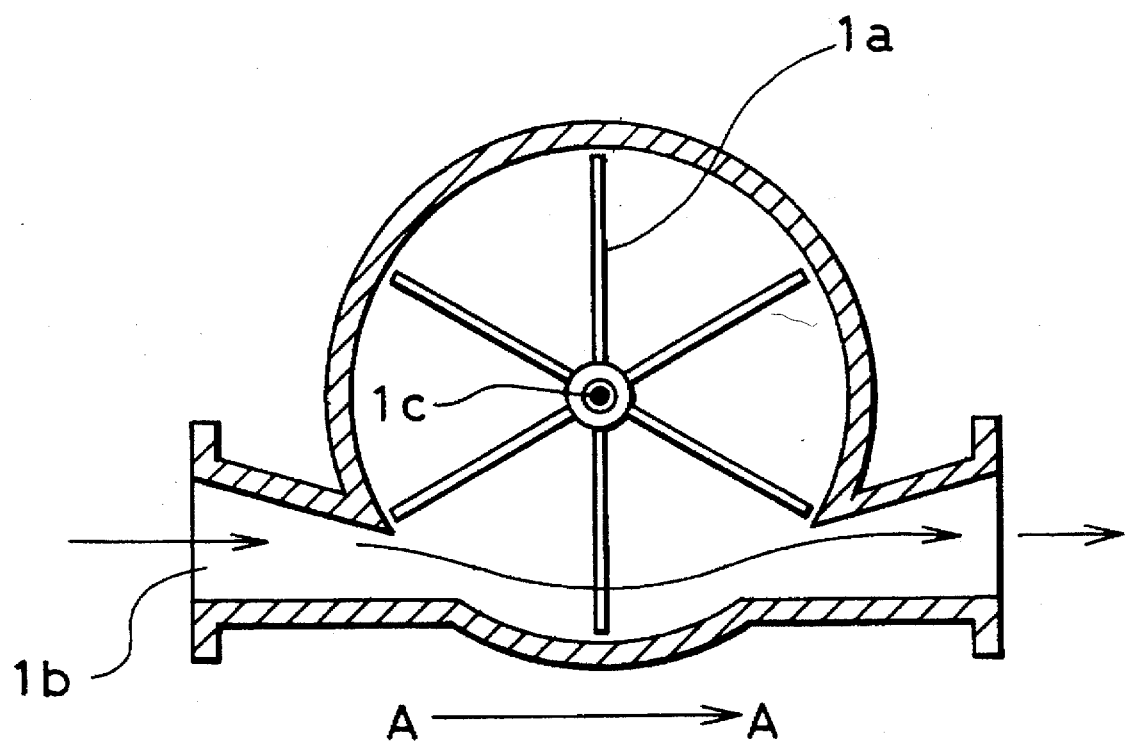
FIG. 1 is a view showing the construction of a conventional impeller type flowmeter.
Figure 2:
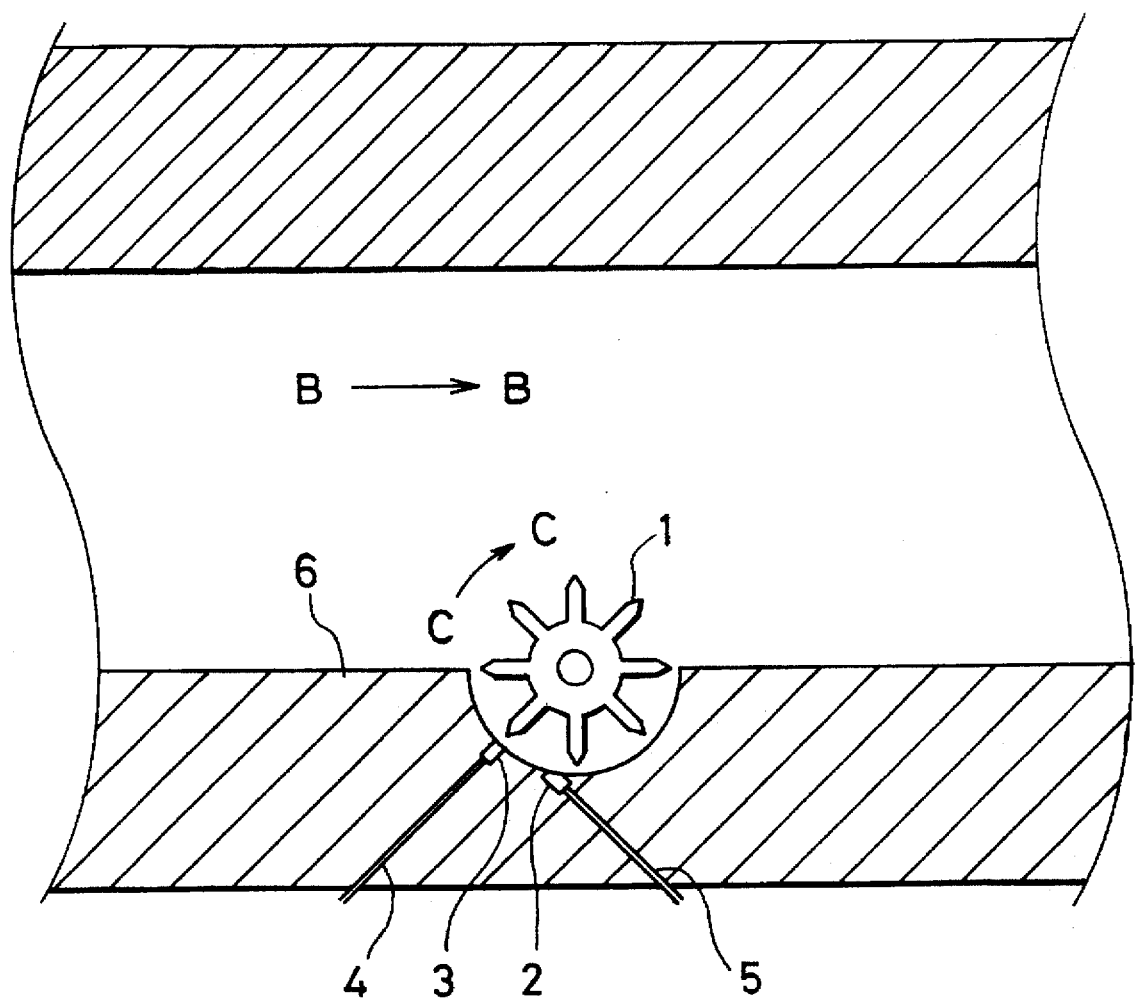
FIG. 2 is a view showing components in a circular tube of a flowmeter according to a first preferred embodiment of the present invention.
Figure 3:
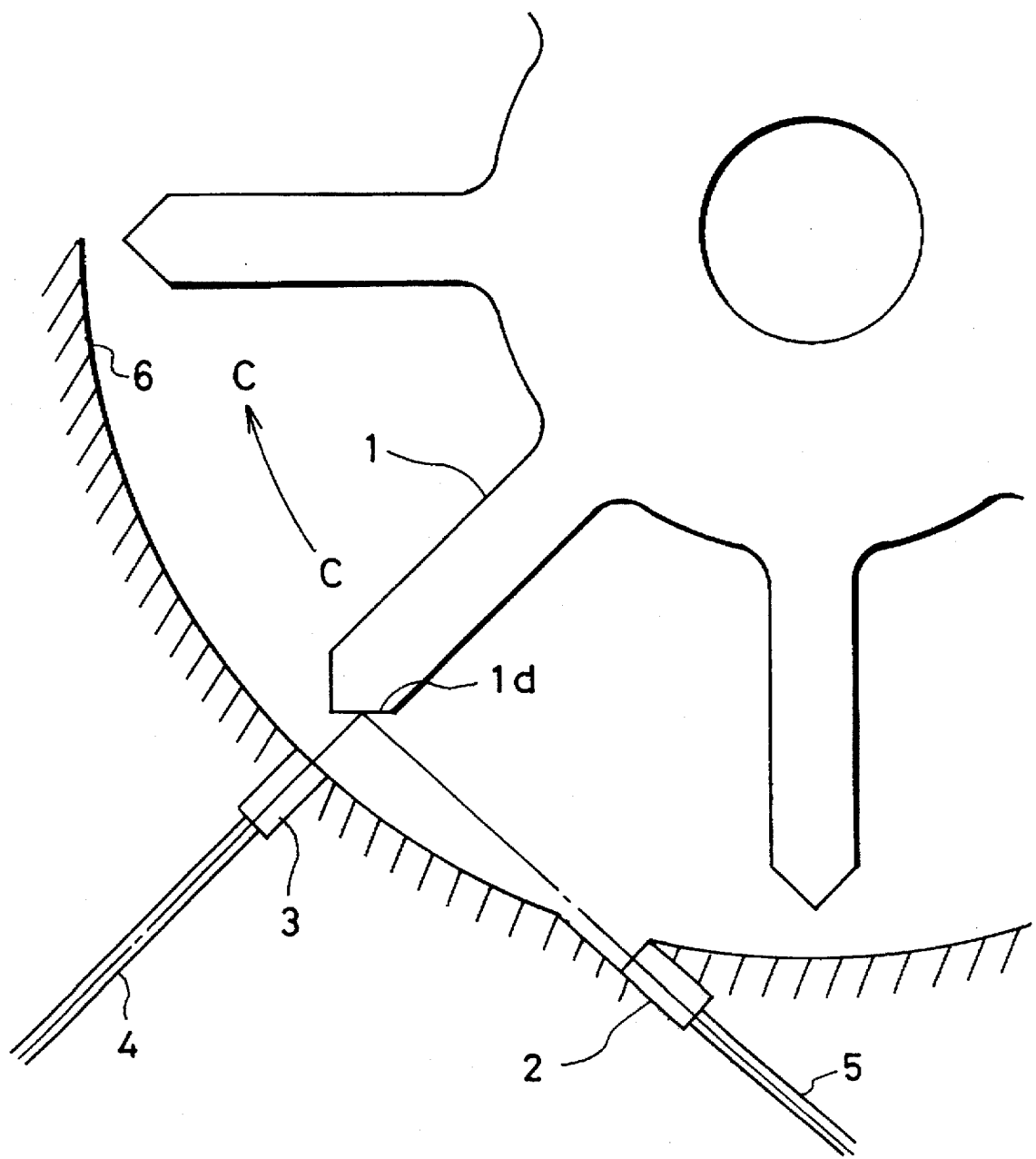
FIG. 3 is an enlarged view of the vicinity of the impeller in the construction shown in FIG. 2.

The first preferred embodiment of the present invention is described with reference to FIG. 2 to FIG. 4. 1 is an impeller which is caused to rotate by a flow force of fluid, 2 is a laser beam or ultrasonic wave transmitter, 3 is a laser beam or ultrasonic wave receiver. 4 is a cable for transmitting a signal received from the receiver 3, 5 is a cable for transmitting a transmission signal to the transmitter 2, 6 is a circular tube in which the abovementioned impeller 1, transmitter 2, receiver 3, etc. are incorporated, 7 is an inputting unit for inputting a signal received from the receiver 3, 8 is an outputting unit for outputting a transmission signal to the transmitter 2, 9 is a data processing unit which obtains, through calculations, the difference between the frequency captured by the receiver 3 and the frequency transmitted by the outputting unit 8 and calculates the rotational speed of the impeller 1 based on the value thus obtained, and 10 is a flowmeter-display for displaying the flow rate obtained from the rotational speed of the impeller 1.

The operation thereof is described below. As shown in FIG. 2, no mechanism for detecting the rotation, including any mechanical factors, is connected to the impeller 1. Therefore, as there is almost no element which may resist the rotation of the impeller 1, it is possible for the impeller 1 to instantaneously make a faithful response to the flow of fluid. When fluid flows inside the circular tube 6, for example, in the direction of the arrow B—B, the impeller 1 is caused to rotate in the direction of the arrow C—C. At this time, as shown in FIG. 3, a transmission signal is issued from the transmitter 2 toward the tip end 1d of the impeller 1. As a fixed relationship exists between the incident angle and the reflection angle of the transmission signal for the impeller 1, the transmission signal is reflected from the tip end 1d of the impeller 1 at a certain moment, and the receiver 3 captures the reflected signal, that is, the captured signal. In this case, as the impeller 1 rotates at all the times, the distance between the tip end 1d of the impeller 1 and the transmitter 2 and the distance between the tip end 1d of the impeller 1 and the receiver 3 change to cause the Doppler effect to be produced. For this reason, as shown in FIG. 4, some change is produced in the frequency which is captured by the inputting unit 7 in comparison with the frequency which is transmitted by the outputting unit 8, the data processing unit 9 obtains the difference between the frequency which the inputting unit 7 captures and the frequency transmitted by the outputting unit 8 through calculations from this change, whereby the rotational speed of the impeller 1 is detected, the velocity of the fluid is obtained, and the flow rate is calculated on the basis of the metering position, sectional area, etc. obtained from the diameter of the circular tube 6. As described above, as no mechanism for detecting the rotation is attached directly to the impeller 1, there is nothing which limits the size of the impeller. Therefore, it is possible to make the impeller very small. The smaller the impeller becomes, the smaller the mass thereof becomes, and as a result the influence due to inertia will be able to reduced. For this reason, it is possible to achieve detection of a high speed fluid and to make a response to instantaneous changes of the velocity.

Furthermore, in a case where a laser beam is issued from the outputting unit 8, optical fiber is used for the cable 5, and a transmitter 2 of optical system such as a lens is used. The output of the receiver 3 of optical system passes through the cable 4 such as optical fiber, signal line, etc, and is inputted in the inputting unit 7. The inputting unit 7 is composed of a photocell etc.

If an ultrasonic wave is used instead of the laser beam, the cables 4 and 5 become a signal line, an ultrasonic wave generator such as an ultrasonic wave oscillator is used for the transmitter 2 and outputting unit 8, an ultrasonic wave receiver may be used for the receiver 3, and a signal amplifier is used for the inputting unit 7.

From the above description, the rotational speed of an impeller (turbine) is metered and detected by using the Doppler effect by utilizing a laser beam or ultrasonic wave, and not depending upon any mechanical framework. Therefore, as no influence such as backlash of gears, etc. is imparted to the metering and detection thereof, a device such as an impeller is able to be made very small by utilizing micro machining techniques, and furthermore, it is possible to detect the flow rate of high speed fluids, and also possible to measure or meter non-steady flows regarding the fuel injection ratios etc of a fuel injection system.

A second preferred embodiment of the invention is described with reference to FIG. 5. The portions which are identical to those in the first preferred embodiment have the same numbers and the description thereof is omitted. 12 is a transmitter or a transmitting means which transmits a laser beam or ultrasonic wave. The transmitter is able to be changed so that it can be used as a receiver (receiving means). 13 is a receiver which captures a laser beam or ultrasonic wave, and the receiver is able to be changed so that it can be used as a transmitter (transmitting means). 14 is a cable which connects the transmitter 12 with the inputting unit 7 or outputting unit 8. 15 is another cable which connects the receiver 13 with the inputting unit 7 or outputting unit 8. 16 is a change switch for changing the connection of the transmitter 12 and receiver 13 with the inputting unit 7 or the outputting unit 8. 16a and 16b are contact points of the switch 16, and 17 is a controller which controls the inputting unit 7, outputting unit 8 or the switch 16. Furthermore, the contact 16a is provided for changeover between the transmitter 12 and the receiver 13 or inputting ting unit 7 and the contact 16b is provided for changeover between the transmitter 12 and the receiver 13 or outputting unit 8. That is, when the receiver 13 is connected to the inputting unit 7 via the contact 16a, the transmitter 12 is connected to the outputting unit 8 via the contact 16b. On the other hand, when the transmitter 12 is connected to the inputting unit 7 via the contact 16a, the receiver 13 is connected to the outputting unit 8 via the contact 16b.

Figure 5:
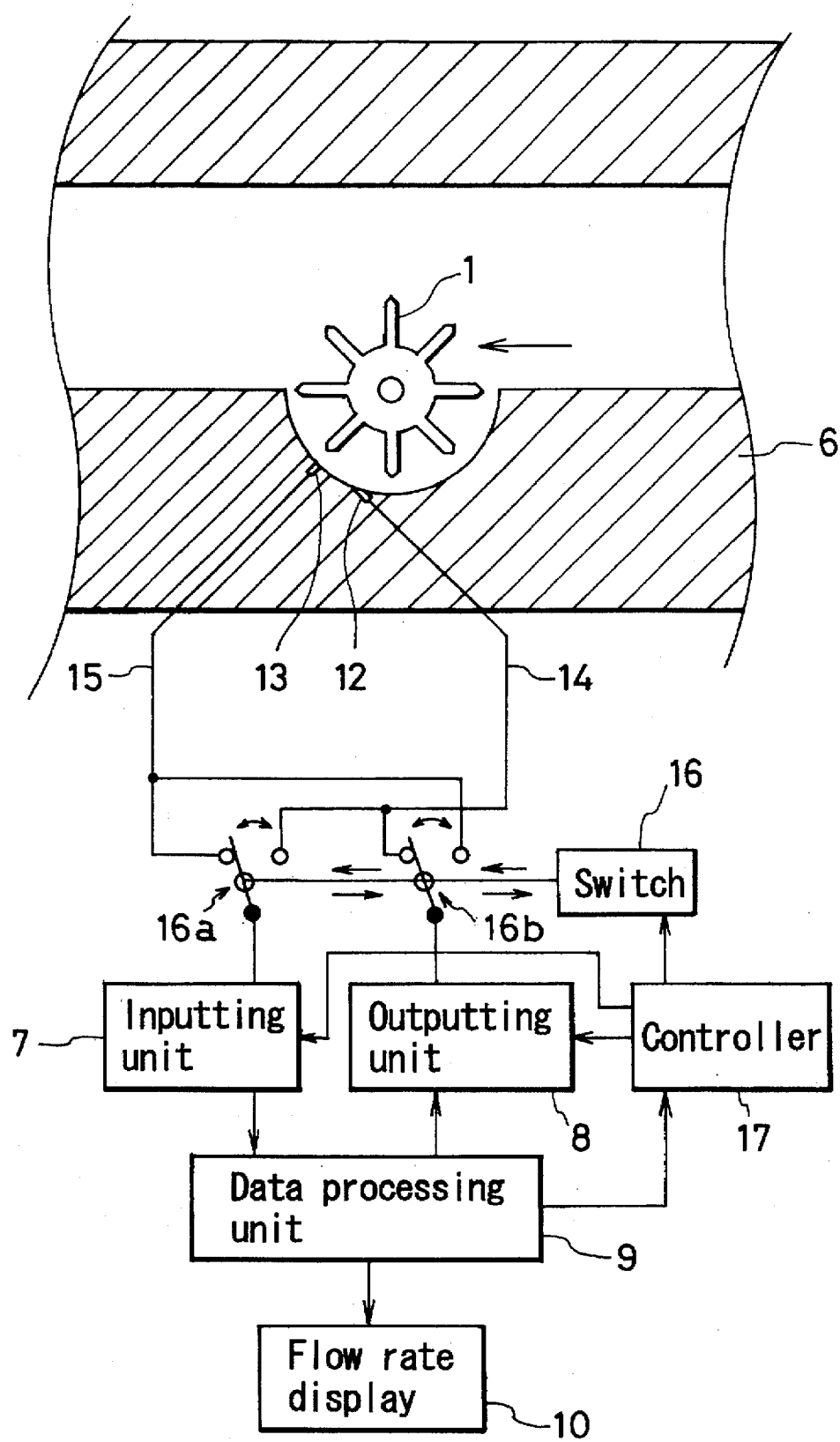
FIG. 5 is a view showing the construction of a flowmeter according to a second preferred embodiment of the present invention.

Next, the operation of the arrangement shown in FIG. 5 is described below. The basic operation is similar to that of the first preferred embodiment. Therefore, only the portions, the operation of which is different from that of the first preferred embodiment, is explained here. As shown in FIG. 5, although the transmitter 12 is a transmitting means like the transmitter 2 in the abovementioned first preferred embodiment, it is possible to change the function thereof so that it will function as a receiving means like the receiver 3. Furthermore, although the receiver 13 is a receiving means, it is able to be changed so as to function as a transmitting means. The cables 14 and 15 which are respectively connected to the transmitter 12 and receiver 13 are able to transmit either a transmission signal or a captured signal.

For example, by utilizing the Doppler effect explained above in connection with the first preferred embodiment, it is possible to detect the flow direction which will be explained below. Firstly, the transmitting means and receiving means are set as defaults, the frequency of the transmission signal is compared with that of the receipt signal by the data processing unit 9. In a case where the frequency of the transmission signal is lower than that of the receipt signal, the distance from the signal being reflected by the impeller 1 which is in revolution to the signal being captured by the receiving means is shortened. It is assumed that in this state, for example, the impeller "rotates normally". Furthermore, in a case where the frequency of the transmission signal is higher than that of the receipt signal, the distance from a signal being reflected by the impeller which is revolving toward the signal being captured by the receiving means is lengthened. It is assumed that the state is, for example, that the impeller 1 "rotates reversely". It is therefore possible to detect the flow direction of the fluid. Furthermore, in a case where the frequency of the above transmission signal is set in advance as a fixed value, the value is compared with the frequency of signals captured by the receiving means, and the frequency captured by the receiving means is made smaller than the above set value, it is possible to detect that the flow direction of fluid has been changed to the reverse direction. The abovementioned set value may be a value which is processed by comparing the frequency of signals transmitted by the transmitting means with the frequency of signals captured by the receiving means. At this time, it is possible to obtain the rotational speed of the impeller 1 regardless of the rotation direction. This is the same even in a case where the rotation direction of the impeller 1, "Normal rotation" or "Reverse rotation", is reversed.

As described above, based on the output showing the flow direction detected by the data processing unit 9, the controller 17 determines a combination of the transmitter 12, receiver 13, inputting unit 7 and outputting unit 8, changes the switch 16, whereby the controller 17 connects the outputting unit 8 and transmitter 12 or the inputting unit 7 and receiver 13, and controls the inputting unit 7 and outputting unit 8. In a case where the switch 16 is changed, and the above connections are made, the difference of the frequency of signals transmitted by the transmitter 12 and the frequency of signals captured by the receiver 13 is calculated by the data processing unit 9, whereby the rotation speed of the impeller 1 is detected, the velocity of the fluid is obtained, and the flow rate is calculated based on information such as the metering position and the cross-sectional area obtained by the inner diameter of the circular tube 6.

In a case where the fluid flows in the reverse direction of the above description, the data processing unit 9 changes the flow direction to be detected to the reverse direction as described above, and the controller 17 changes the switch 16, connects the outputting unit 8 to the receiver 13 which functions as the transmitting means, and connects the inputting unit 7 to the transmitter 12 which functions as the receiving means.

As described above, it is possible to detect the flow rate and direction of the fluid in the circular tube 6. Furthermore, by reversely changing the position of the transmitter and receiver along with the reversed rotation direction of the impeller 1, it is possible to detect the flow rate even though the impeller 1 rotates in either direction.

A third preferred embodiment of the present invention will be described with reference to FIG. 6 to FIG. 9. 30 is a minute turbine, 30a is a blade of the abovementioned turbine, 31 is a fuel channel in which the abovementioned turbine 30 etc is disposed, 32 is a light emitting element, 33 is a light receiving element disposed opposite to the abovementioned light emitting element 32, 34 is a light emitting unit which causes the light emitting element 32 to emit light, 35 is a calculation unit which receives a light receiving signal outputted by the light receiving element 33 and obtains the measured or metered value through calculations, and 36 is a transparent resin mold.

Figure 6:
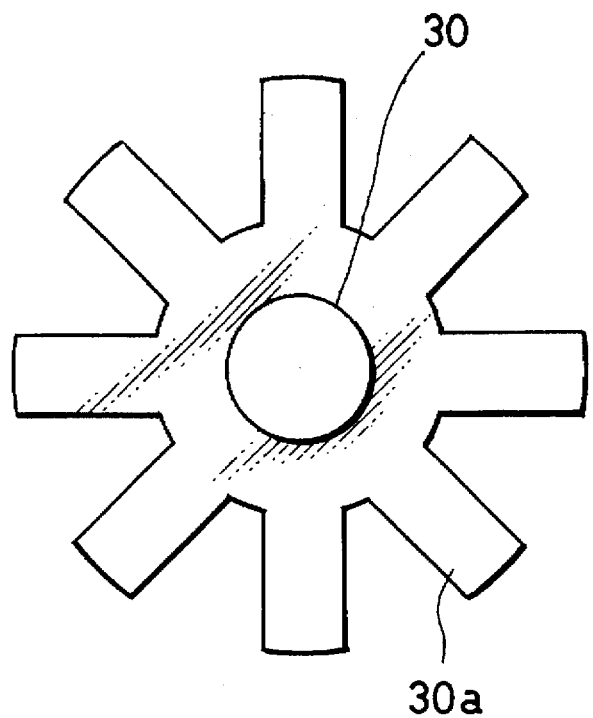
FIG. 6 is the front elevational view of a turbine used in a flowmeter according to a third preferred embodiment of the present invention.
Figure 7:
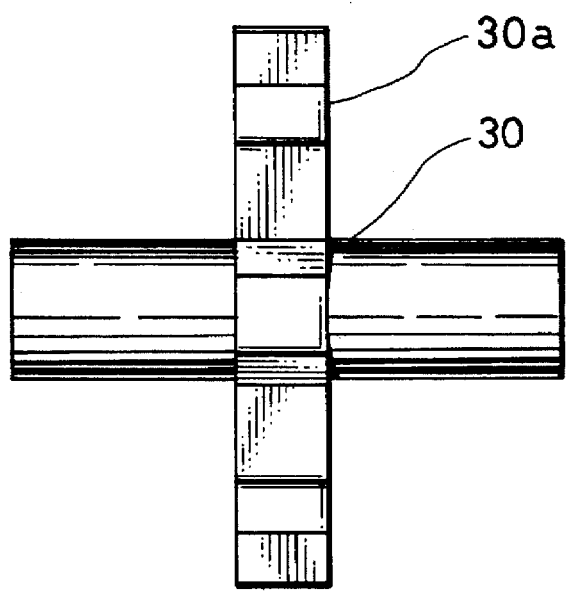
FIG. 7 is a side elevational view of the turbine shown in FIG. 6.

The action thereof will be described below. The third preferred embodiment is able to detect the number of revolutions (frequency) of the minute turbine 30 with a photo sensor equipped with a light emitting element 32 and light receiving element 33. As the turbine 30 is not directly provided with any mechanism consisting of mechanical components to detect the number of revolutions, no external force other than the fluid force acts on the turbine. Furthermore, as a photo sensor is employed for detection, the detection may not be hardly influenced by noises such as electro-magnetic waves, etc. The appearance of the minute turbine 30 is shown in FIG. 6 and FIG. 7. As the turbine is minute, the mass thereof is small and the inertia thereof will be small, too. Therefore, the response is much improved, and the turbine is durable, with respect to external impacts. Furthermore, as the load applied to the turbine is reduced due to a small pressure receiving surface, it is able to cope with a high injection pressure. As the outer diameter of the minute turbine 30 which is micro-machined, is able to be disposed without enlarging the outer diameter of the fuel channel 30. Also as the distance between the light emitting element 30 and the light receiving element 33 is decreased, a low output LED may be used for the light emitting element 32 and a low sensitivity sensor may be used for the light receiving element 33.

Figure 8:
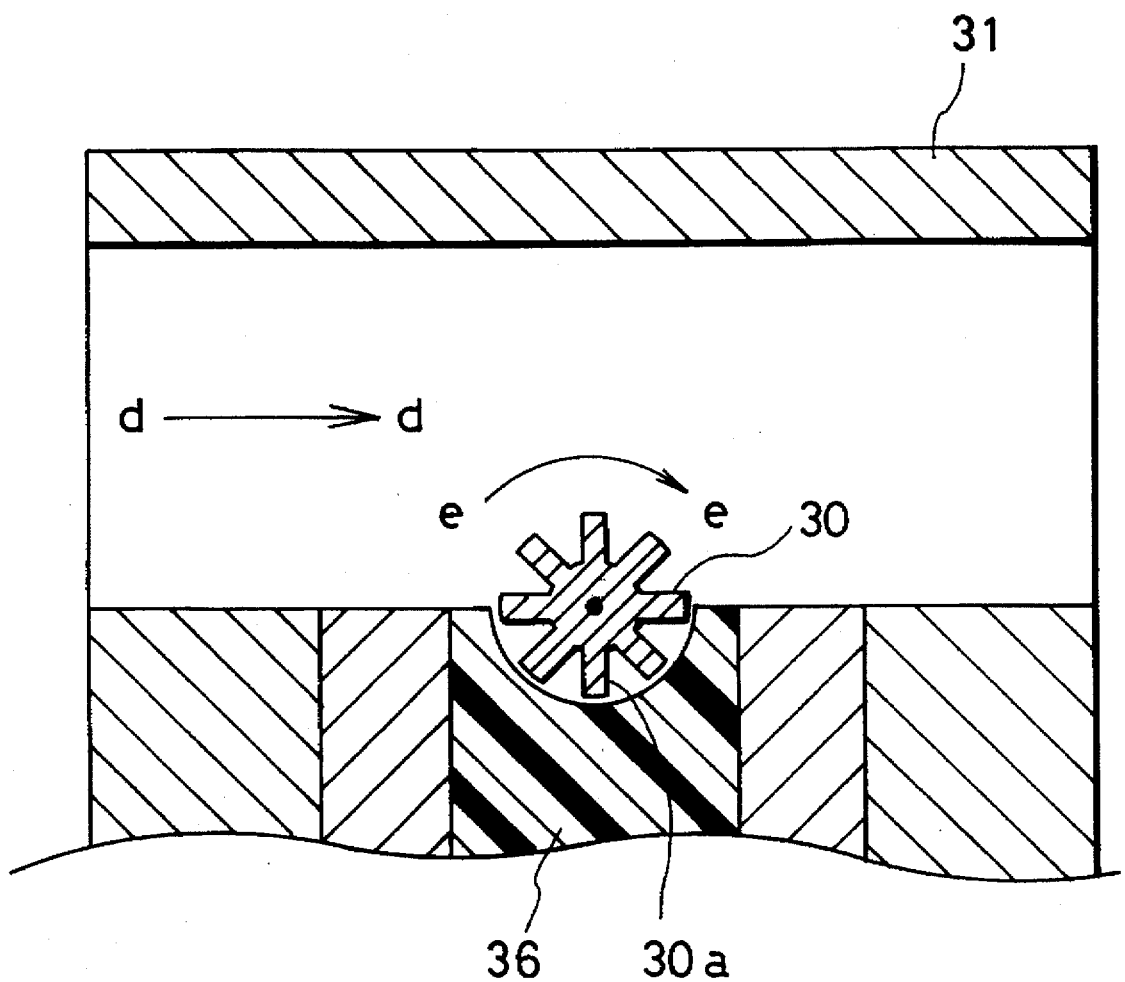
FIG. 8 is a view showing the arrangement of a turbine in the circular tube of a flowmeter according to the third preferred embodiment of the present invention.
Figure 9:
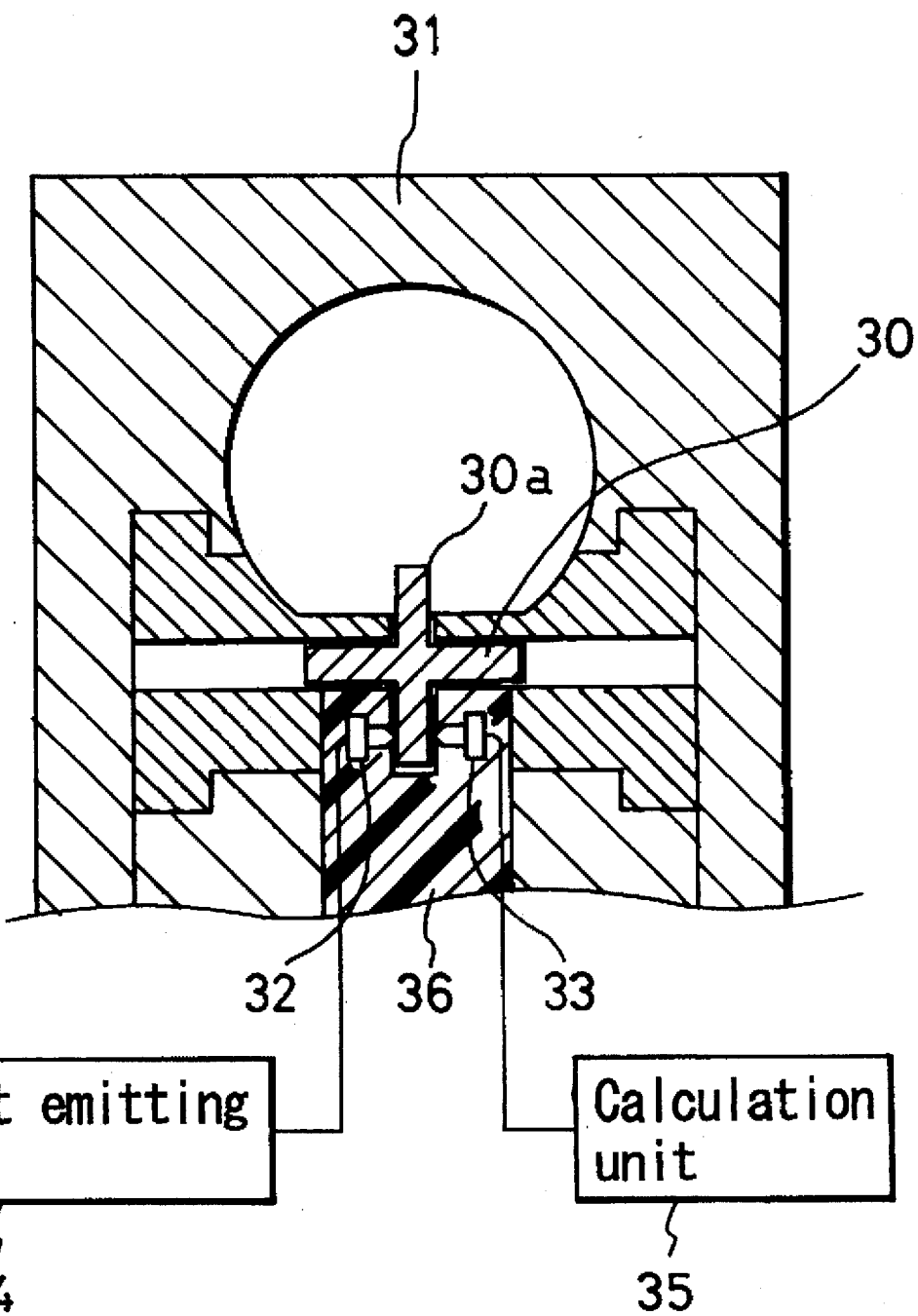
FIG. 9 is a view showing the construction of a flowmeter according to the third preferred embodiment of the present invention.

As shown in FIG. 8, in a case where the turbine 30 is installed in a state where a part of the turbine is in contact with the fuel which flows in the fuel channel 31 of a diesel engine, the turbine 30 is caused to rotate in the direction of the arrow e—e if it is assumed that the fuel flowing direction is in the direction of the arrow d—d. At this time, as shown in FIG. 9, the light emitting means and light receiving means are disposed opposite to each other at the portion of the turbine 30, which is not in contact with the flowing fuel. The light emitting means consists of a light emitting unit 34 which causes the light emitting elements 32 to emit light. The light receiving means consists of a light receiving element 33. Output signals of the light receiving element 33 are inputted in the calculation unit 35. The light emitting element 32 and light emitting element 33 are fixed in the fuel channel by a resin mold having a light penetration property.

For example, if it is assumed that the light emitting element 32 is composed of LED etc and the light emitting unit 34 is a driver circuit of the LED, the light which is emitted by the LED is shielded by the blades 30a of the turbine 30, the light receiving element 33 such as a phototransistor etc is able to receive light only between ween the blades 30a of the turbine 30 so as to cause the light receiving signals of the light receiving element 33 to become pulse signals. The calculation unit 35 which is a calculating means counts these pulse signals, obtains the number of revolutions of the turbine 30, that is, the frequency of the light received, meters the injection duration of fuel, meters the injection ratio of non-steady flow in during duration of the above injection, and meters the fuel injection rate per injection by integrating the above injection ratio.

As described above, since the turbine 30 is minute, it does not constitute any resistance to the flowing fluids. Therefore, the fuel injection characteristics are not influenced at all. Besides, since the inertia of the turbine is small, the response is very quick, and it is possible to detect the injection ratios of non-steady flows during the duration of injection. Furthermore, by integrating the above injection ratio, it is possible to accurately detect the fuel injection rate per injection. Still furthermore, as the number of revolutions of the turbine is detected by a photosensor, no external force other than the fluid force acts on the turbine itself, and therefore, it is possible to accurately detect the flow rate without influencing the fuel injection characteristics.

According to the present invention as described above, as the flow rate of a fluid is able to be obtained by detecting the rotational speed of an impeller disposed in a flow channel of the fluid to be metered, it is possible to detect an instantaneous rotational speed of the impeller and to meter non-steady flows.

Figure 4:
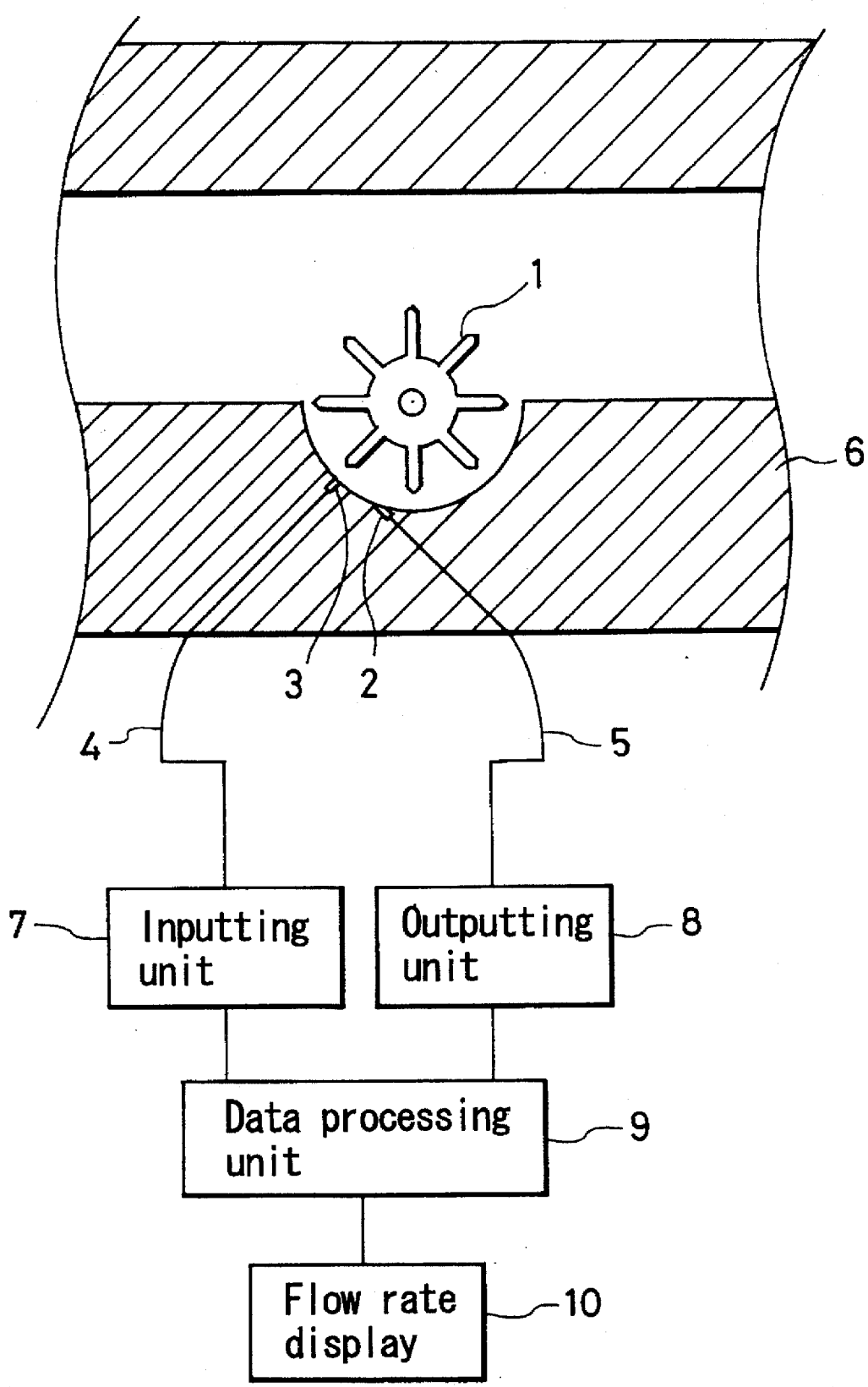
FIG. 4 is a view showing components which are provided outside the circular tube of the flowmeter according to the first preferred embodiment of the present invention.

Especially, according to the present invention shown in FIG. 4, since there is provided a transmitting means for transmitting a laser beam or ultrasonic wave to the tip end of an impeller which is revolving, a receiving means for capturing a laser beam or ultrasonic wave reflected by the impeller, and a data processing unit which obtains, through calculations, the difference between the frequency of signals transmitted by the transmitting means and the frequency of signals captured by the receiving means and detects the rotational speed of the impeller based on the value obtained therefrom, no influence due to wearing of gears and backlashes is experienced, and it is possible to remarkably reduce an impeller type flowmeter and to detect the flow rate of a high speed fluid. Still furthermore, it is possible to detect an instantaneous rotational speed of an impeller and to meter non-steady flows.

According to the present invention as shown in FIG. 5, the transmitting means is able to be changed so as to function as a receiving means, and the receiving means is able to be changed so as to function as the transmitting means, these means are changed on the basis of the flow direction detected by the data processing unit, and the above data processing unit is devised to calculate the difference between the frequency of signals transmitted by the transmitting means and the frequency of signals captured by the above receiving means. Therefore, it is possible to detect the rotation speed according to the flow direction even though the impeller is caused to rotate in either direction.

Furthermore, especially, in a case where the data processing unit is constructed so that, when the value obtained by comparing the frequency of signals transmitted by the transmitting means with that of signals captured by the receiving means is made smaller than the preset value, the detecting direction of the fluid flowing direction is reversed, it is possible to detect the rotational speed of the impeller and at the same time to detect the flow direction of the fluid.

According to the present invention as shown in FIG. 6 to FIG. 9, as a turbine is disposed in a fuel channel in a diesel engine, a light emitting means and light receiving means are disposed opposite to each other with the turbine placed therebetween, and the injection ratio, injection time and injection rate are able to be metered based on the frequency obtained by the above light receiving means, it is possible to accurately detect the flow rate without influencing the injection characteristics of the fuel. Furthermore, the response to changes of the flow rate is much improved, and it is possible to detect the injection ratio of non-steady flows during the duration of injection. Still furthermore, the pressure receiving area is able to be much reduced, and it is possible to cope with a high injection pressure. Besides, the inertia is reduced by making the turbine mass smaller, and therefore the turbine strength against external impacts is much improved. Still furthermore, it is possible to use a low output light emitting element and a low sensitivity light receiving element by making the interval between the light emitting element and light receiving element small, thereby causing the production cost to be reduced. A photo sensor is utilized to detect the number of revolutions of the turbine, thereby avoiding influences due to magnetic electricity, etc.

What is claimed is:

1. A flowmeter comprising:
   an impeller rotatably mounted in a recess formed in an interior wall of a flow channel structure, said impeller having a plurality of impeller blades;
   a transmitter positioned to transmit signals in a direction such that the transmitted signals will intersect a rotational path of a tip of each of said plurality of impeller blades, wherein said transmitter can be changed so as to function as a receiver;
   a receiver positioned to receive signals which have been transmitted from said transmitter and reflected by said tips of said impeller blades, wherein said receiver can be changed to function as a transmitter; and
   a data processing unit, operably connected to said transmitter and said receiver, for calculating a rotational speed of said impeller by calculating a difference between the frequency of the reflected signals received by said receiver and the frequency of the signals transmitted by said transmitter,
   wherein if the calculated difference is smaller than a preset value, said data processing unit causes said transmitter to function as a receiver and said receiver to function as a transmitter thereby reversing the detecting direction.

2. The flowmeter as claimed in claim 1, wherein the signals transmitted by said transmitter are laser beams.

3. The flowmeter as claimed in claim 1, wherein the signals transmitted by said transmitter are ultrasonic waves.

4. A flowmeter comprising:
   an impeller rotatably mounted in a flow channel structure, said impeller having a plurality of impeller blades;
   a transmitter positioned to transmit signals in a direction such that the transmitted signals will intersect a rotational path of a tip of each of said plurality of impeller blades, wherein said transmitter can also function as a receiver;
   an outputting unit connected to said transmitter;
   a receiver positioned to receive signals which have been transmitted from said transmitter and reflected by said tips of said impeller blades, wherein said receiver can also function as a transmitter;

an inputting unit connected to said receiver;

a data processing unit, operably connected to said inputting unit and said outputting unit, for calculating a rotational speed of said impeller by calculating a difference between a frequency of the reflected signals received by said receiver and a frequency of the signals transmitted by said transmitter, a controller connected to said data processing unit; and a switch connected to said controller for switching the connections between said transmitter, said receiver, said outputting unit, and said inputting unit so that said transmitter is connected to said inputting unit and said receiver is connected to said outputting unit to reverse a detecting direction by causing said transmitter to function as a receiver, and said receiver to function as a transmitter, wherein if the calculated difference is smaller than a preset value, said controller, based on information received from said data processing unit, controls said switch to reverse the detecting direction.

5. The flowmeter as claimed in claim 4, wherein the signals transmitted by said transmitter are laser beams.

6. The flowmeter as claimed in claim 4, wherein the signals transmitted by said transmitter are ultrasonic waves.

* * * * *